United States Patent Office 3,258,742
Patented June 28, 1966

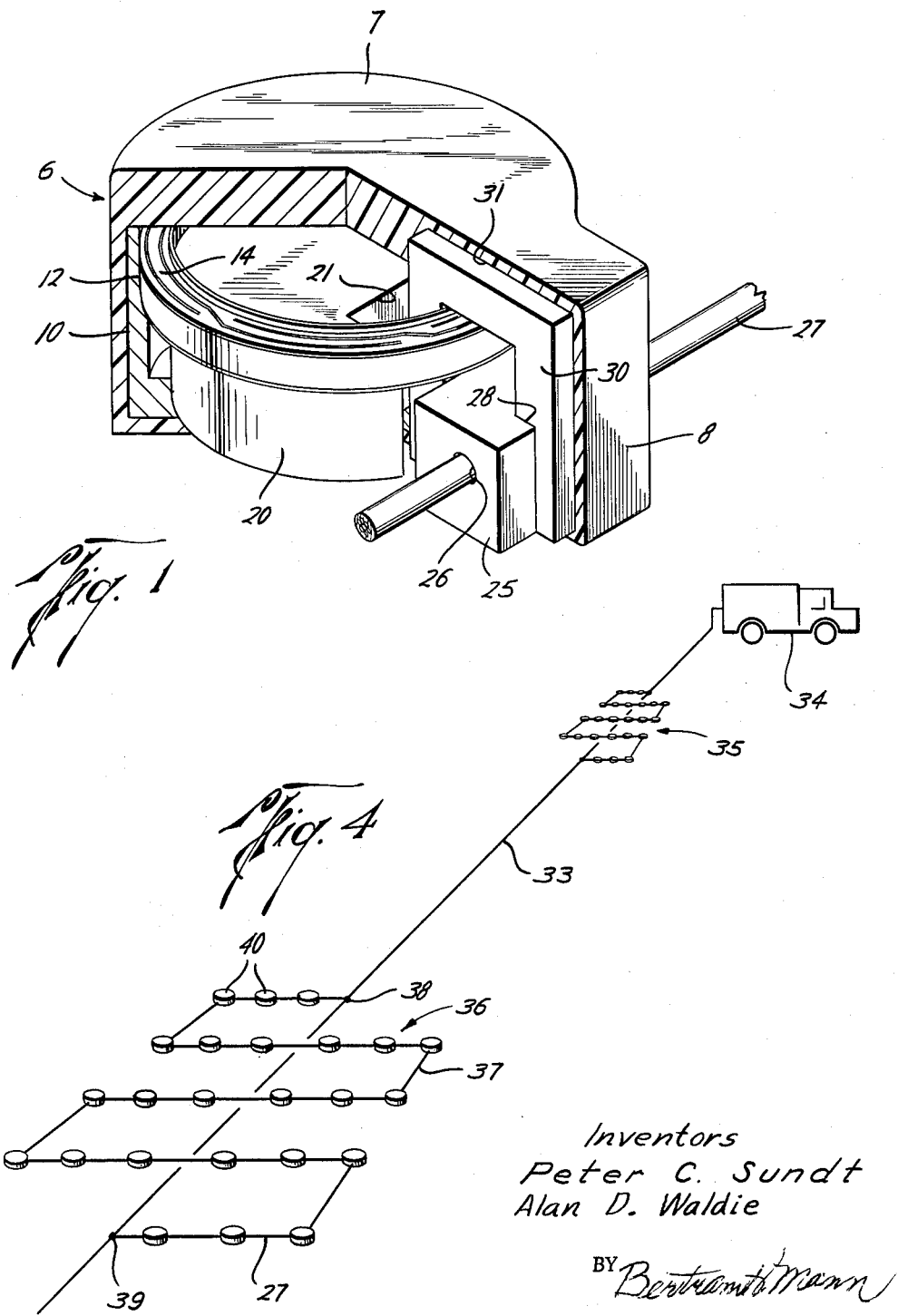

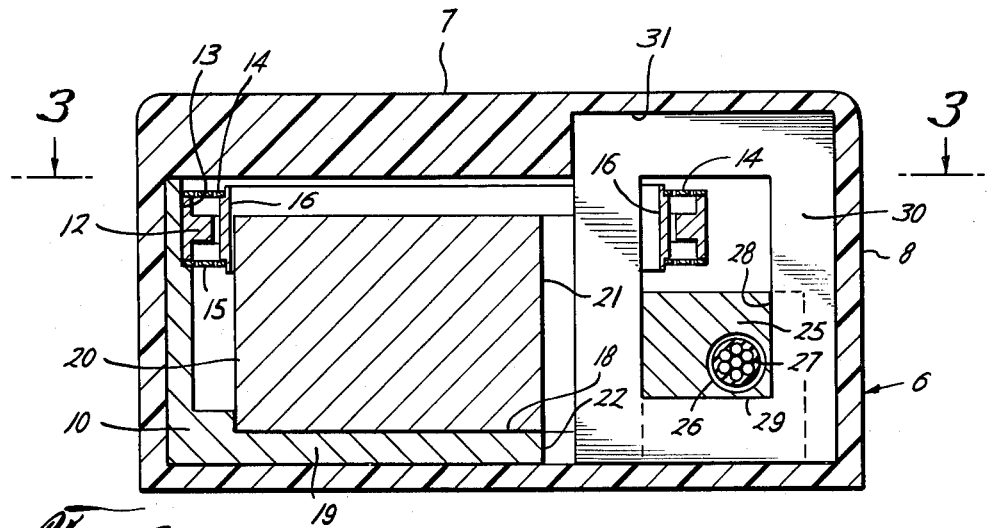
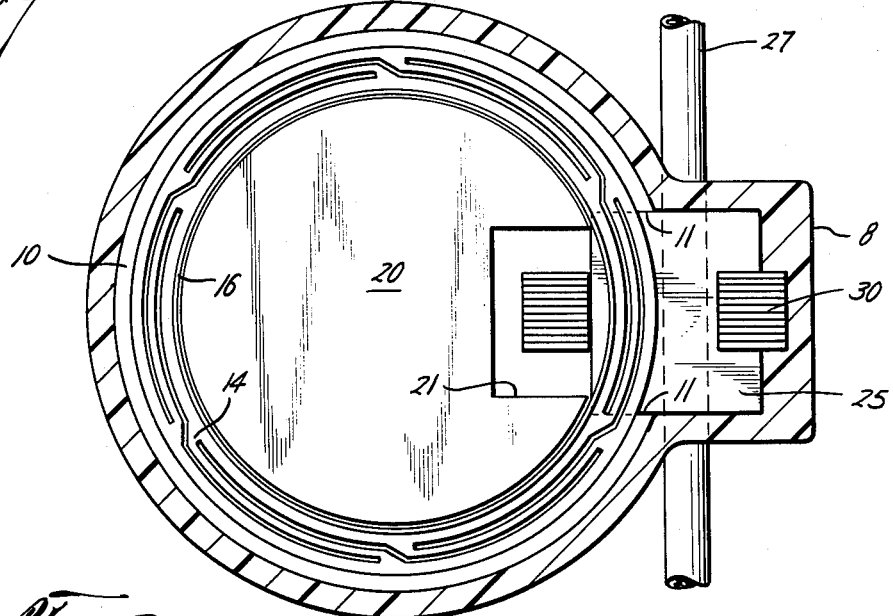

3,258,742
INDUCTIVELY COUPLED SEISMOMETER
Peter C. Sundt, Los Altos Hills, Calif., and Alan D. Waldie, Calgary, Alberta, Canada, assignors to Mandrel Industries, Inc., Palo Alto, Calif., a corporation of Michigan
Filed May 20, 1963, Ser. No. 281,695
7 Claims. (Cl. 340—17)

This invention relates to seismometers such as are used in geophysical prospecting and consists particularly in novel means for coupling a seismometer to a signal cable through which signals from the seismometer are carried to recording equipment.

Modern seismic exploration techniques call for the use of a large number of seismometers at each detector station on a seismic spread cable. The seismometers at each station are disposed in a straight line or arranged in a matrix or "patch" interconnceted by a "jumper" cable which is, in turn, electrically connected to the main spread cable. The seismometers are interconnected so that their outputs algebraically add. The reason for using a large number of seismometers at each detector station is to reduce the unwanted response of the seismometer to horizontal surface waves that emanate from the seismic energy source, for instance, an explosive charge, a dropped weight, or a vibrator. If the linear dimension of the matrix or patch is long compared to the wave length of the horizontally traveling wave, there will be substantial algebraic cancellation with the result that the output of the patch responsive to horizontal wave excitation will be greatly reduced from the output of an individual seismometer within the patch. On the other hand, vertically or nearly vertically traveling compression waves will excite all the seismometers in the patch substantially in phase, thus greatly accentuating the response of the patch to seismic echoes from deep subterranean reflectors. In as much as the relative response to vertical and horizontal waves is a function of the number of seismometers used in the patch, the trend has been toward using larger numbers of seismometers in each patch. The trend has also been toward using smaller, less expensive seismometers, since the requirement for sensitivity of each one in a patch is lessened as the number of seismometers per patch is increased.

However, the use of large numbers of seismometers per patch has greatly magnified the problem of maintaining low electrical leakage to ground within the patch. It is evident that the greater the number of take-outs in the patch jumper cable, the greater chance there is for electrical leakage to ground through moisture invasion. Also, each electrical take-out in a jumper cable is a weak point mechanically and a potential spot for open or short circuit after extensive handling. Finally, electrical take-outs constructed in such a way as to minimize the above problem become excessively expensive.

Another disadvantage in splicing the seismometers to the signal cable in the usual manner is in the resultant difficulty of storage and paying out from mobile equipment.

Accordingly, an object of the present invention is to provide means for coupling a seismometer to a signal cable without any direct electrical connection or splice.

Another object is to provide a novel seismometer which can be inductively coupled to the signal cable so that any number of seismometers can be readily positioned as desired along the cable or jumper.

In accordance with the present invention there is provided a suitable rugged and sealed casing of non-magnetic material for planting on the ground to be explored. Within the casing there is rigidly secured a permanent magnet, and pole piece structures for the magnet are mounted on the casing inner wall so as to provide an annular air gap. A conductive ring armature is positioned in the gap and is resiliently supported from the pole piece structure. A tunnel extends through a portion of the casing at one side of the magnet through which the jumper conductor or cable can extend. A high permeability, closed core extends around the conductor tunnel as well as the ring armature for inductively coupling the armature and the conductor. No direct connection at all is made between the seismometer and the insulated signal cable.

In the accompanying drawings which illustrate the invention,

FIG. 1 is a perspective view of the novel seismometer, with portions broken away to show the underlying structure;

FIG. 2 is a vertical center section through the seismometer;

FIG. 3 is a horizontal section taken substantially on line 3—3 of FIG. 2; and

FIG. 4 is a view of a seismic exploration signal code setup.

The seismometer is enclosed within a casing 6 of generally cylindrical form and having a top 7 which may be separately formed to provide means for inserting the internal working parts into the casing. It is contemplated that the casing will be made of a suitable plastic material and that the separate parts thereby may be molded in position, as shown, after completion of the assembly. Projecting from one side of the cylindrical body part of the casing is a generally rectangular hollow casing part 8.

Lodged about the inner wall of the cylindrical portion of the casing is a similarly shaped inner pole piece structure 10 which terminates, as at 11 within the hollow interior of box-like casing extension 8. An inner pole piece ring 12, of general T section, is firmly lodged in a recess 13 in the upper part of outer pole piece 10. A pair of annular leaf springs 14 and 15 are secured to the upper and lower surfaces of inner pole piece 12 and project inwardly therefrom. Secured to the free inner edges of springs 14 and 15 and resiliently supported thereby is a metal ring 16 of suitable conductive material, as copper. The outer and inner pole pieces 10 and 12 are formed of magnetic material, as steel.

Securely lodged within a recess 18 in the bottom wall 19 of outer pole piece structure 10 is a generally cylindrical permanent magnet 20 having a radial slot 21 in its right-hand portion, facing the interior of casing extension portion 8. Bottom pole piece wall 19 has a slot 22 registering with magnet slot 21 and the opening between the ends 11 of the side members of the outer pole piece.

Traversing the lower part of casing extension 8 is a block 25 of insulating material, conveniently the same as the material of the casing, through which extends an aperture or tunnel 26. This aperture or tunnel provides for receiving therethrough the conductor cable 27. Block 25 has rectangular intersecting slots 28 and 29, respectively, in its right side and bottom portion which are aligned with previously mentioned slots 21 and 22 in magnet 20 in outer pole piece bottom wall 19. A laminated, highly permeable, generally rectangular core member 30 is vertically lodged in casing extension 8, a slot 31 being provided therefor in casing top wall 7. The core member fits snugly in recesses 28 and 29 of the cable receiving block 25. However, slots 22 and 21 in the outer pole piece and the permanent magnet do not contact the core member.

FIG. 4 illustrates a main signal cable 33 extending from a processing truck 34, which may carry suitable recording equipment. At 35 and 36 there are illustrated separate matrices or "patches" of seismometers, each consisting of a jumper cable 37 secured at its ends, as at 38 and 39, to separate conductors in main cable 33. A plurality of the novel seismometers, generally designated 40, are slidably received upon the jumper cable, in the manner clearly illustrated in FIGS. 1, 2 and 3, and the jumper cable is oriented in any suitable manner.

In operation, a suitable number of the geophones will be threaded onto a jumper cable and the ends of this cable then electrically connected to individual conductors of the main seismometer cable. The individual seismometers may be positioned along the jumper cable as desired since no splicing is required. The seismometers, then, are all planted upon the ground to be explored. Vibrations of the ground will be transmitted to the casing of each seismometer causing relative motion between the permanent magnet 20 and the resiliently supported armature ring 16. This in turn will cause generation of currents in the armature ring. The magnetic field of such generated currents will pass through highly permeable core structure 30 linking the armature with jumper cable 27. Thus, metal ring 16 and the jumper cable threaded through the casing form, in effect, the primary and secondary of a transformer, and the conductor is thereby inductively coupled to the seismometer so as to generate currents in the jumper. Due to the extremely weak currents generated and induced, substantial magnification will be necessary, as is customary, prior to translation of the signal to a record.

Various shapes and arrangements of parts may be provided as will occur to those skilled in the art and the exclusive use of all modifications as come within the broadest scope of the appended claims is contemplated.

What is claimed is:

1. A seismometer comprising a magnet, an armature movably mounted adjacent said magnet, a mount constructed for receiving therethrough a conductor for directing electrical currents to a recorder, and a core received about said armature and said mount for inductively linking said armature and a conductor in said mount.

2. A seismometer comprising a casing to be planted on the ground, a magnet within and secured to said casing, an armature for said magnet resiliently carried by said casing, an apertured mount in said casing for receiving therethrough a conductor for directing electrical currents to a recorder, and a closed flux-carrying core received about said armature and said mount for inductively coupling said armature and a conductor passed through said mount.

3. In combination with an insulated conductor for directing electrical currents to a seismic recorder, a seismometer comprising a casing to be planted in the ground, a magnet in and secured to said casing, there being an aperture through said casing receiving said conductor therethrough, an armature in said casing adjacent said magnet and resiliently mounted with respect thereto, and a core structure looped about said conductor and said armature and inductively coupling the same for inducing in said conductor currents analogous to relative movements of said magnet to said armature caused by vibration of said casing.

4. A seismometer comprising a casing for planting on the ground, a magnetic body secured in said casing, a tunnel through a part of said casing spaced from said magnet for receiving a recorder connected conductor, a conductive ring received about and resiliently supported with respect to said body, and a core member looped about said tunnel and through said ring and inductively coupling the same.

5. A seismometer comprising a casing to be planted on the ground, a compact, magnetic body secured in said casing, pole piece structure secured in the inner wall of said casing and spaced from said body to form an annular gap, a ring of conductive material resiliently supported from said structure and extending around said body in said gap, a tunnel through said casing at one side of said magnetic body for receiving a recorder connected conductor extending through said casing, there being a recess in the side of said body adjacent said tunnel, and a closed core member extending around said tunnel and said ring and through said recess for inductively coupling said seismometer with a conductor in said tunnel.

6. A seismometer as described in claim 5 in which said magnetic body and said pole piece structure are of generally cylindrical contour and further including circular leaf spring means supporting said ring from said pole piece structure.

7. A seismometer comprising an insulating casing for planting on the ground, a generally cylindrical, permanent magnet rigidly mounted in said casing, pole piece structure for said magnet on the inner wall of said casing, there being an annular gap between said magnet and said structure, a ring armature extending around said magnet in said gap, leaf spring rings projecting inwardly from said casing inner wall and said pole piece structure and resiliently supporting said armature relative to said magnet whereby vibration of said casing tends to produce relative movements of said magnet and said armature and generation of currents in said armature, an insulating tunnel through a part of said casing at one side of said magnet for receiving therethrough a recorder connected conductor cable, and a high permeability, closed core member lodged in said casing about said tunnel and said armature for inductively linking said armature and a cable extending through said tunnel.

No references cited.

BENJAMIN A. BORCHELT, *Primary Examiner.*

PETER A. SHANLEY, *Assistant Examiner.*